Jan. 8, 1929.
E. HENRICSON
1,697,868
TOOL HOLDER
Filed Jan. 7, 1927
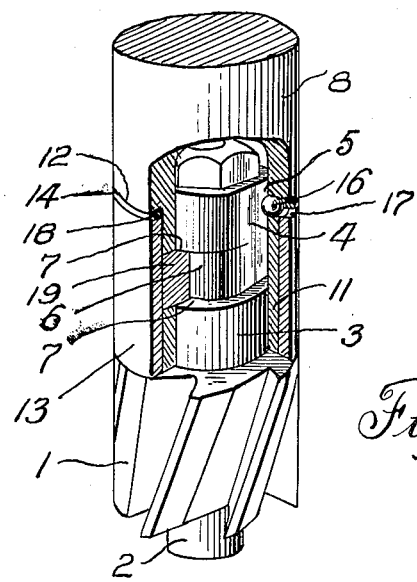
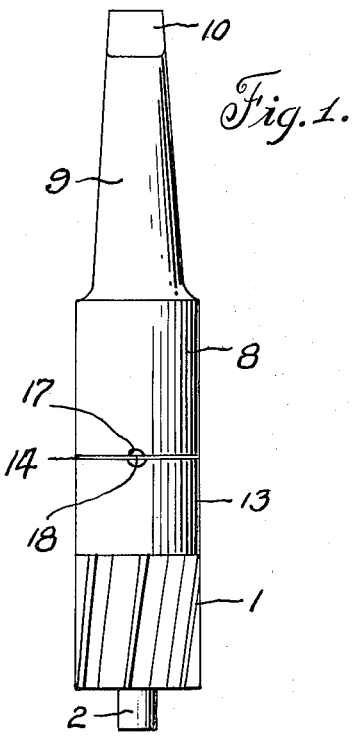
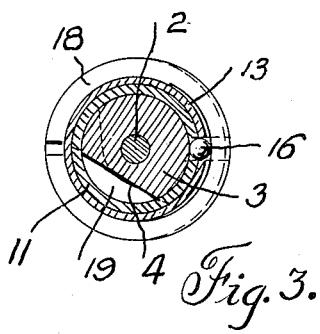
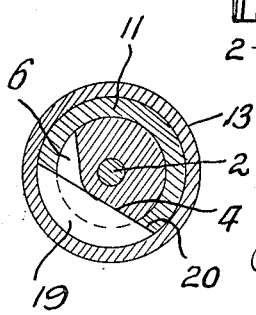
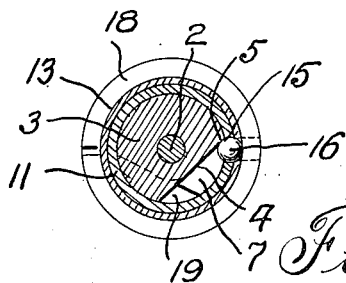
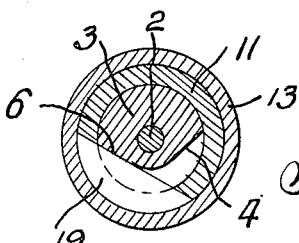
Inventor
Edwin Henricson
BY
ATTORNEYS Patented Jan. 8, 1929.

1,697,868

UNITED STATES PATENT OFFICE.

EDWIN HENRICSON, OF DETROIT, MICHIGAN.

TOOL HOLDER.

Application filed January 7, 1927. Serial No. 159,518.

My invention aims to provide a quick detachable connection for a tool with a holder, and the tool may be in the form of a counterbore, drill or boring instrumentality, while the holder may be in the form of a socket, spindle, adapter or other driven tool receiving member. The quick detachable connection is of that type wherein initial longitudinal movement of the tool places the same in position within a socket to be partially rotated and by such rotation become interlocked with socket members which prevent accidental displacement of the tool, particularly while the same is being driven, yet permit of ready disengagement of the tool when it is desired to remove the same.

My invention is further characterized by a socket and tool connection that may be easily and quickly established, manufactured at a comparatively small cost and made applicable to various types of interengaging members.

My invention will be hereinafter specifically described and then claimed, and reference will now be had to the drawing, wherein—

Figure 1 is a side elevation of a tool holder and tool provided with a connection in accordance with this invention;

Fig. 2 is a perspective view of a portion of the same, partly broken away and partly in section, showing the tool locked in its holder, and Figs. 3 to 6 inclusive, are horizontal sectional views of the tool relative to the holder incident to connecting the tool to the holder.

As illustrative of a type of tool that may be provided with a connection in accordance with my invention, I show a counterbore 1 having a pilot 2. The counterbore has a cylindrical shank 3 and one side of this shank is cut away to provide a facet 4 extending approximately two-thirds of the length of the shank. The facet provides an abrupt shoulder 5 and leading into said facet, intermediate the ends of the shank, is a short circumferentially disposed groove 6 providing opposed shoulders 7.

As illustrating a holder for the tool shank, I show a cylindrical socket 8 having a spindle 9 terminating in a tang 10. The socket has a reduced lower cylindrical end portion 11 providing an annular shoulder 12. Shrunk or otherwise fixed on the reduced end portion 11 of the socket is a sleeve 13 having its lower end flush with the lower end of the socket and its upper end in spaced relation to the shoulder 12 so as to form an annular groove 14.

Prior to mounting the sleeve 13 on the reduced end portion of the socket, said socket, at the shoulder 12, is provided with a seat 15 for a detent 16, preferably in the form of a ball. The upper end of the sleeve 13 and the shoulder 12 are recessed, as best shown in Fig. 1, to provide a cylindrical opening 17 affording clearance for the detent 16, and this opening and the seat 15 may be formed after the sleeve 13 is mounted on the reduced end of the socket.

The detent 16 is yieldably held on its seat by a split resilient ring 18 placed in the groove 14.

Prior to mounting the sleeve 13 on the reduced end of the socket a segment shaped key or retaining member 19 is mounted in a kerf or slot 20 transversely disposed in the reduced end 11 of the socket. The arc of the key 19 conforms to the circumference of the reduced end of the socket and the straight edge of the key extends into the socket and is adapted to engage in the groove 6 of the tool shank, between the shoulders 7, as best shown in Fig. 2. The key 19 may be suitably fixed in the slot 20 or may be retained therein by the sleeve 13 mounted on the reduced end of the socket.

When the spindle 3 is inserted in the socket it is necessary that the spindle be positioned so that the facet 4 will pass the straight edge of the key 19. As the spindle 3 passes the key 19 the upper end of the spindle forcibly retracts the detent 16, there being a snap action which places the upper end of the counterbore 1 against the lower end of the socket. The retracted condition of the detent 16 is shown in Fig. 3 and the key 19 confronting the facet 4 is shown in Fig. 4. The inward movement of the spindle 3 is limited by the counterbore 1 engaging the lower end of the socket and the lower shoulder 7 engaging the lower face of the key 19. With the groove 6 merging into the facet 4, the counterbore and its spindle can be turned in a counterclockwise direction. This movement of the spindle relative to the socket places the shoulders 7 of the spindle above and below the key 19, as shown in Fig. 6, and the abrupt shoulder 5 releases the detent 16 as shown in Fig. 5. This permits the detent to engage the shoulder or facet 4 and hold the spindle with the key 19 extending into the groove 6. The key prevents longitudinal displacement of the spindle relative to the socket and establishes a driving relation between the socket and spindle.

The angularity of the shoulder 5 relative to the detent 16 permits of the spindle being turned in a clockwise direction to retract the detent 16 when the spindle is to be removed. Counterclockwise rotation of the spindle places the key 19 opposite the facet 4 and then the spindle may be withdrawn from the socket.

I attach considerable importance to the detent and key being located in the socket, instead of the shank of the tool, because the shank is not unnecessarily cut away, and its strength and rigidity sacrificed for establishing a driving machine between the shank and the socket. The average tool shank can be prepared for my quick detachable connection so that it may be only necessary to furnish the socket should the parts be separately made.

One embodiment of my invention has been illustrated, but it is to be understood that the structural elements are susceptible of such changes as are permissible by the appended claims.

What I claim is:—

1. A tool holder comprising a socket having a reduced end providing a shoulder, a key mounted in the reduced end of said socket, a sleeve mounted on the reduced end of said socket to retain said key in place, said socket and sleeve having registering openings at said shoulder, a detent in the opening of said socket and protruding into said socket, a resilient ring inserted between said shoulder and the adjacent end of said socket and engaging said detent, and a tool shank insertable in said socket, said tool shank having a facet providing clearance for said key and having a groove merging into said facet and adapted to receive said key.

2. A tool holder comprising a socket having a reduced end providing a shoulder, a key mounted in the reduced end of said socket, a sleeve mounted on the reduced end of said socket to retain said key in place, said socket and sleeve having registering openings at said shoulder, a detent in the opening of said socket and protruding into said socket, a resilient ring inserted between said shoulder and the adjacent end of said socket and engaging said detent, a tool shank insertable in said socket, said tool shank having a facet providing clearance for said key, and a shoulder engageable by said detent, said tool shank having a groove merging into said facet and adapted to receive said key.

In testimony whereof I affix my signature.

EDWIN HENRICSON.